(12) United States Patent
Feng et al.

(10) Patent No.: US 12,492,634 B2
(45) Date of Patent: Dec. 9, 2025

(54) ELECTRIC-PULSE FRACTURING DEVICE AND METHOD FOR HARD ROOF OF COAL MINE BASED ON SELF-SEALING WATER BAG

(71) Applicant: Taiyuan University of Technology, Taiyuan (CN)

(72) Inventors: Guorui Feng, Taiyuan (CN); Xiaoze Wen, Taiyuan (CN); Jun Guo, Taiyuan (CN); Ruipeng Qian, Taiyuan (CN); Wenbo Huang, Taiyuan (CN); Jie Zhang, Taiyuan (CN); Wenming Feng, Taiyuan (CN); Zi Wang, Taiyuan (CN); Xu Zhang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 95 days.

(21) Appl. No.: 18/425,890

(22) Filed: Jan. 29, 2024

(65) Prior Publication Data

US 2025/0154868 A1 May 15, 2025

(30) Foreign Application Priority Data

Nov. 9, 2023 (CN) .......................... 202311484735.1

(51) Int. Cl.
*E21C 37/18* (2006.01)
*E21C 41/18* (2006.01)

(52) U.S. Cl.
CPC .............. *E21C 41/18* (2013.01); *E21C 37/18* (2013.01)

(58) Field of Classification Search
CPC .......... E21B 43/26; E21C 41/18; E21C 37/18; F42D 3/04
See application file for complete search history.

(56) References Cited

U.S. PATENT DOCUMENTS

2004/0240143 A1* 12/2004 Kim ........................ F42D 1/045
361/251

FOREIGN PATENT DOCUMENTS

WO WO-9703796 A1 * 2/1997 ............... F42D 3/00

* cited by examiner

*Primary Examiner* — Sunil Singh
(74) *Attorney, Agent, or Firm* — DLA Piper LLP (US)

(57) ABSTRACT

An electric-pulse fracturing device for hard roof of coal mine based on a self-sealing water bag and an using method thereof are provided. The device includes a power switch, a charging power supply, a current limiting protection resistor, an energy storage capacitor and a high-voltage electric pulse switch connected in sequence. The energy storage capacitor is connected with an end of a gas gap switch, an other end of the gas gap switch is connected with an assembled self-sealing water bag high-voltage electric pulse electrode structure through a high-voltage cable, and the electrode structure is fixed through an assembly rod. The self-sealing water bag high-voltage electric pulse electrode structure includes a self-sealing water bag and an electrode structure capable of focusing shock wave energy, and the number of the self-sealing water bag high-voltage electric pulse electrode structure depends on fracturing effect.

7 Claims, 12 Drawing Sheets

ELECTRIC-PULSE FRACTURING DEVICE AND METHOD FOR HARD ROOF OF COAL MINE BASED ON SELF-SEALING WATER BAG

CROSS-REFERENCE TO RELATED APPLICATIONS

This application claims priority to Chinese Patent Application No. 202311484735.1, filed on Nov. 9, 2023, the contents of which are hereby incorporated by reference.

TECHNICAL FIELD

The disclosure relates to a high-voltage electric-pulse fracturing device for hard roof of coal mine based on a self-sealing water bag and method of use thereof, belonging to fracturing technology for hard roof of coal mine, which may be applied to high-voltage electric pulse rock breaking and coal mine roof fracturing.

BACKGROUND

In a process of coal mining, mine pressure and rock stratum control are important links in a safe and efficient production of coal mines. With a continuous increase of a mining depth, a geological condition is gradually deteriorating, and a probability of mine safety accidents is also increasing. In the process of mining, a large-area hanging roof caused by a hard roof will lead to an accumulation of huge energy in coal and rock mass, which will lead to occurrences of coal mine safety accidents such as rib spalling, large deformation of a roadway and rock burst.

Prevention and control of the rock burst induced by stress concentration caused by the hard roof is a most important link in the process of coal mining, which has a significant impact on safety of underground mining in coal mines. At present, relatively mature technologies for hard roof cracking and stress regulation include a drilling blasting technology and a hydraulic fracturing technology. Hydraulic fracturing is inefficient in rock breaking because of a large size of equipment, a large amount of water needed and difficulty in sealing holes under a high pressure. The drilling blasting technology requires a use of chemical explosives. In a case of gas in coal mine, a risk is high, meanwhile a lot of dust will be produced, leading to certain limitations of drilling blasting.

At present, an emerging technology-high-voltage electric pulse is widely used in the field of rock crushing by scholars, so the high-voltage electric pulse also has broad prospects in the field of top cutting and pressure relief in coal mining. Using the high-voltage electric pulse to fracture the hard roof may effectively avoid problems of coal mine gas explosion and dust diffusion caused by blasting and may also avoid a high pressure problem of the hydraulic fracturing in rock breaking, so as to effectively weaken the hard roof with very little water flow.

A high-voltage electric pulse technology based on electro-hydraulic effect refers to charging a capacitor bank with a high-voltage direct-current power supply, and then discharging through an underwater electrode in a very short time, generating a pulse discharge in water, forming a plasma channel that penetrates the two electrodes and expands continuously, and at the same time generating a bubble pulsation phenomenon, and a shock wave is formed under a joint action of both. Because the water has characteristics of low compressibility, low deformation energy and low heat energy loss, a water shock wave propagating in the water may transfer energy to a surrounding rock almost without loss and relatively uniform according to a hydraulic action of the water. Under an action of high temperature and high pressure in a discharge process, a water ball formed by a high pressure air mass expands rapidly outward and transfers the energy to the rock stratum. The shock wave in the water acts on the rock stratum evenly, and the rock stratum only breaks to produce a plastic flow and over-crushing, thus improving a utilization rate of the energy. At the same time, water and detonation gas seep into the fracture, and a splitting action of "water wedge" makes a fracture expand and extend. In addition, the water in a fracturing hole is atomized at a high temperature and a high pressure, absorbing gas and dust, playing a role of atomization and dust reduction, and reducing pollution of dust to a working face.

At present, there is no mature industrial application equipment and technology for the high-voltage electric pulse technology based on electro-hydraulic effect in underground hard roof fracturing. Especially when fracturing the underground hard roof, it is necessary to drill a hole upward to the hard roof in the working face or the roadway, and it is difficult to block the water seal hole when pouring water into the fracturing hole after a electrode structure is installed. Meanwhile, an underground hard roof mostly involves directional fracturing, which realizes efficient stress regulation. Therefore, it is necessary to focus on the electric pulse energy diffused and transmitted in a form of spherical waves in the gap of between the two electrodes, so as to maximize a energy release and control a release direction. In addition, when the underground hard roof is generally thick, and a fracturing effect of a single high-voltage electric pulse electrode structure is poor, there is no related report on a technology that requires a combination of multiple electrode structures in series and parallel.

SUMMARY

The disclosure aims to provide an electric-pulse fracturing device for hard roof of coal mine based on a self-sealing water bag and a using method thereof, designs an electric pulse electrode device based on a portable self-sealing water bag suitable for an underground coal mine construction site, and puts forward an underground high-voltage electric pulse fracturing implementation method based on the device, which may conveniently and efficiently realize underground hard roof fracturing, stress regulation and efficient rock breaking.

The disclosure provides a high-voltage electric-pulse fracturing electrode device for hard roof of coal mine based on the self-sealing water bag, including a power switch, a charging power supply, a current limiting protection resistor, an energy storage capacitor and a high-voltage electric pulse switch connected in sequence, where the energy storage capacitor is connected with an end of a gas gap switch. An other end of the gas gap switch is connected with an assembled self-sealing water bag high-voltage electric pulse electrode structure through a high-voltage cable, and the electrode structure is fixed through an assembly rod and then connected with the high-voltage cable.

The self-sealing water bag high-voltage electric pulse electrode structure includes a self-sealing water bag and an electrode structure capable of focusing shock wave energy. When a underground hard roof of coal mine fractures, a number of the self-sealing water bag high-voltage electric pulse electrode structures depends on a fracturing effect. When the fracturing effect of a single electrode structure in a single hole fails to meet a requirement, multiple water-filled self-sealing water bags (without electrodes) and multiple assembled self-sealing water bag high-voltage electric pulse electrode structures are alternately fixed on the assembly rod.

The assembly rod has a main body of a hollow high-strength steel pipe. The high-voltage cable connecting a discharge electrode and a grounding electrode may pass through the assembly rod to protect the high-voltage cable from being damaged during electric pulse discharge. A top end of the assembly rod may extend into a bottom of a fracturing hole, so the assembled self-sealing water bag high-voltage electric pulse electrode structure may be fixed at an appropriate position on the assembly rod, corresponding to an optimal electrode depth in a fracturing design. When a thickness of a fractured stratum is relatively large, a fracturing effect of a single electrode in the fracturing hole may no longer meet needs, the assembly rod may conveniently realize a series combination of multiple water bag electrode structures. Meanwhile, each water bag without electrodes is filled between each two self-sealing water bag high-voltage electric pulse electrode structures, so as to realize phased plugging, so that multi-electrode synchronous discharge may be used for layered fracturing, and high-efficiency fracturing of the stratum may be realized.

The self-sealing water bag includes a water bag body and a sealing structure, and a main body of the water bag is elongate and cylindrical after water injection. In order to ensure that the assembled water bag is smoothly sent to a designated position in a fracturing hole, a diameter of the water bag is 2-4 mm smaller than a diameter of the fracturing hole drilled by a coal mine underground drilling rig, and the diameter of the water bag is adjustable according to a model of the underground drilling rig and a drilling diameter in a production process. A sealing device mainly refers to a water inlet at an upper end of the bag body. The water inlet is made of hard polyethylene, and an outer side of the water inlet is in a conventional thread shape, and a matching nut is self-fastened and sealed. An inner wall of the water inlet is provided with a groove guide rail for embedding the assembled electrode, and a bottom of the water inlet is provided with a self-sealing embedded groove for embedding an electrode fixing disc.

After the production of the water bag is completed, tap water or NaCl solutions with different concentrations, $CaCl_2$) solutions with different concentrations, $AlCl_3$ solutions with different concentrations, etc. required for an underground blasting effect of the coal mine may be pre-filled in a factory. After a solution is fully filled, the water inlet is sealed by a matching cover. An optimal type and an optimal concentration of the solution may be determined by conducting experiments in a laboratory according to differences of underground fractured strata. A specific experimental process is as follows: coring in an underground operating stratum, carrying out a fracturing test of rock samples in the laboratory, monitoring pulse energy generated by different conductive liquids in a discharge process, and analyzing differences of solution types and concentrations on the fracturing effect of the rock samples, thereby analyzing a best conductive liquid that may be used for rock breaking. Accordingly, the water bag may also be directly transported to the underground after the production is completed, and local materials are taken before an underground application, and the mine water is selected as the conductive liquid, which is more practical in a practical application environment.

The electrode structure capable of focusing shock wave energy is mainly feature lies in that the electrode structure may be embedded in the water inlet self-sealing embedded groove of the self-sealing water bag and capable of gathering energy, and includes a high-voltage electrode, a grounding electrode, a polypropylene insulating sleeve, a matching rubber gasket, an electrode shell, a fixing nut and a fixing ring, where a fixing disc of the electrode shell and the rubber gasket matching the fixing disc may be embedded into the self-sealing embedded groove of the water inlet for self-locking sealing to prevent water in the main body of the water bag from flowing out.

In an embodiment, an upper end of the high-voltage electrode is provided with a thread, the high-voltage electrode is arranged in the polypropylene insulating sleeve, the polypropylene insulating sleeve and the electrode shell are firmly connected through a polypropylene disc and the fixing ring. A rub gasket is sleeved at a contact position of a polypropylene sleeve ring and the electrode shell to strengthen the polypropylene sleeve ring and the electrode shell and ensure tightness, and prevent the water in the water bag from invading an upper part of the electrode when a tip of the discharge electrode is immersed in the water.

The polypropylene insulating sleeve is mainly used for insulating protection and fixing the high-voltage electrode, the high-voltage electrode is arranged in the polypropylene insulating sleeve, and a polypropylene insulating sleeve tube is arranged between the high-voltage electrode and the electrode shell to play an insulating protection role. A polypropylene ring is provided at a middle-upper part of the polypropylene insulating sleeve for fixing the polypropylene insulating sleeve tube on the electrode shell.

The high-voltage electrode is arranged in the polypropylene insulating sleeve, and the electrode extends from the polypropylene insulating sleeve by 2-4 mm, which is called a lower end of the electrode (discharge electrode), and a diameter of an extending part is 2-4 mm, and a tip is chamfered by 45°. Another end of the electrode extends out of the polypropylene insulating sleeve, and an M8-sized thread is laid on the extending part and is called an upper end of a high-voltage electrode thread for connecting the high-voltage cable.

The electrode shell is a high-strength steel hollow circular tube, and the polypropylene insulating sleeve covering the electrode passes through the electrode shell. The electrode shell includes three cylinders with different outer diameters, and an upper end of an upper first cylinder is internally provided with a step groove for embedding the polypropylene ring at the middle-upper part of the polypropylene insulating sleeve to fix the high-voltage electrode. An outer side of a lower third cylinder is a smooth structure. A middle second cylinder is a thin disc with a diameter twice a diameter of the third cylinder of the shell, and two small circular-arc protrusions are arranged at two ends of the middle second cylinder along the radial direction to serve as positioning sliders used for fixing the electrode and sealing the water bag by matching with the embedded groove at the bottom of the water bag water inlet. The first cylinder at an upper end of the electrode shell is provided with an external thread for connecting a polypropylene insulating sleeve fixing nut, a top of the first cylinder is a step hole, an inner wall of an end part is slotted to ensure that the polypropylene ring outside the polypropylene insulating sleeve may be embedded in the polypropylene insulating sleeve, and a bottom surface of the second cylinder is slotted for placing the rubber gasket. An internal thread is arranged at a center of a bottom of the third cylinder for fixing the grounding electrode.

The grounding electrode includes a tip of the grounding electrode and a threaded cylinder at the lower part. A smooth cylinder at the upper part has a diameter of 4 mm and a length of 6 mm, and the top is a tip with a chamfer of 45°. A lower half is an M8 threaded cylinder with a length of 30 mm. The grounding electrode is embedded and fixed in an internal thread groove on a bottom surface of the electrode shell through the thread, so as to ensure that the grounding electrode and the discharge electrode are oppositely arranged along an axis in rectangular windows of the electrode shell, and then the grounding electrode is fixed by the nut. A distance between the grounding electrode and the high-voltage electrode may be adjusted by rotating the thread at the lower end of the grounding electrode, and the distance between the two electrodes is set to 1 mm-10 mm.

A shock wave generated by tip discharge of the two electrodes in the water is a key to rock breaking, and a discharge channel is determined by the distance between the two electrodes. During a research, an impact on a high-voltage electric pulse breakdown time and a shock wave wavefront time may be achieved by changing the distance between the two electrodes, resulting in different pulse action times, which in turn affects the fracturing effect. Before the underground hard roof fracturing, electrical pulse monitoring and analysis are carried out in the laboratory, so a quantitative relationship between electrode spacing, released energy and rock breaking effect is obtained, and a best electrode distance suitable for the underground hard roof fracturing is obtained.

A lower part of the third cylinder of the electrode shell is provided with a pair of opposite rounded rectangular windows, which expose a discharge space at the tip of the electrode and realize energy focusing at a moment of discharge. In particular, hemispherical shock waves released from the rectangular windows are superimposed in the water and a rock mass, further enhancing a rock breaking and fracturing effect. It is required that the grounding electrode and the high-voltage electrode are inside the rectangular windows, and cross-sectional dimensions of rounded rectangular window holes are multiple dimensions such as 2 mm×10 mm, 3 mm×10 mm or 4 mm×10 mm. When the underground fracturing needs to enhance a degree of rock fragmentation, the electrode structure is controlled in a shock wave direction and focused in energy by adjusting and replacing electrodes with different spacing and sizes and by replacing and screening according to an actual underground construction.

The disclosure provides a high-voltage electric-pulse fracturing method for hard roof of coal mine based on the self-sealing water bag: when in use, connecting the charging power supply, the energy storage capacitor, the current limiting protection resistor, the power switch, the high-voltage electric pulse switch, the gas gap switch and the self-sealing water bag high-voltage electric pulse electrode structure through the high-voltage cable first, completing a construction preparation work of a high-voltage electric pulse workstation, and then connecting the high-voltage cable which is connected with the electrode which passes through the assembly rod in the high-voltage electric pulse workstation; finally, putting the assembled and connected self-sealing water bag electric pulse electrode structure into the fracturing hole in cooperation with the assembly rod, and fixing the assembled electrode into the fracturing hole only by means of a self-supporting fixing bracket on the assembly rod. There is no complicated hole sealing and water plugging link, thus greatly simplifying underground construction links.

After all the preparation work is completed, turning on the power switch, observing a voltage value of the charging power supply, and determining a charging voltage (5 kV-10 kV) according to an actual situation. When a predetermined voltage value is reached, turning off the power switch and turning on the high-voltage electric pulse switch to discharge. At the moment of discharge, the tip of the electrode is pulsed in the water, and a formed plasma channel penetrates two poles of the electrode and expands continuously, and at the same time, a bubble pulsation phenomenon is generated. Under a joint action of both, a shock wave is formed, and a high-energy shock wave instantly breaks the water bag. Uniformly and losslessly transferring energy to the surrounding rock by the water shock wave propagating in the water, thereby achieving a purpose of fracturing.

Specifically, in the above-mentioned mining high-voltage electric pulse hard roof fracturing method: firstly completing construction and layout of the underground high-voltage electric pulse workstation, and then drilling and fracturing according to a design drawing, and performing hard rock fracturing after assembling the electrode structure based on the self-sealing water bag. The method specifically includes following steps:

S1, arranging the high-voltage electric pulse workstation in a underground proper position, and transporting the high-voltage cable, the energy storage capacitor, the current limiting protection resistor, the power switch, the high-voltage electric pulse switch and the gas gap switch, etc. to the underground proper position, and assembling and connecting equipment in the underground high-voltage electric pulse workstation;

S2, according to a fracturing design drawing, not newly equipping drilling equipment, and drilling a fracturing hole with a specified depth at a position delineated in the drawing by using an existing mining drilling rig;

S3, completing an assembly work of a high-voltage electric pulse electrode on a ground, putting the high-voltage electrode arranged in the polypropylene insulating sleeve into the electrode shell, where the polypropylene disc protruding from the middle-upper part of the polypropylene insulating sleeve is embedded in the step groove at an upper end of the upper first cylinder; fixing the high-voltage electrode in the electrode shell to prevent the high-voltage electrode from shaking radially, where the rubber gasket at a contact position between the high-voltage electrode and the electrode shell ensures connection tightness and prevents the water from invading an upper wiring position of the discharge electrode when the electrode is in the water; then, fastening the high-voltage electrode penetrated into the electrode shell via the polypropylene insulating sleeve fixing nut through the external thread of the first cylinder at the upper end of the electrode shell, connecting the polypropylene insulating sleeve fixing nut and the high-voltage electrode into a whole to prevent the polypropylene insulating sleeve from slipping and shaking along an axial direction of the electrode shell; finally, screwing in the grounding electrode through the internal thread at a bottom of the electrode shell, and oppositely arranging the grounding electrode and the high-voltage electrode along an axis in a hollow hole of the electrode shell, and adjusting a distance between the grounding electrode and the high-voltage electrode by adjusting a screwing length of the grounding electrode, and then fixing the grounding electrode at the bottom of the electrode shell with a grounding electrode fixing nut after the grounding electrode is adjusted to an optimal position;

S4, after the electrode structure is assembled, assembling the electrode structure and the self-sealing water bag; after the water bag is filled with the conductive liquid, inserting the assembled electrode structure into the water bag through the water inlet, where a disc protruding from middle of the electrode shell has two electrode shell positioning sliders at two ends along the radial direction, and the positioning sliders may insert the assembled electrode structure into the water bag along a water inlet embedded groove guide rail; when the electrode structure slides into the bottom of the water inlet, rotating the electrode structure, and embedding the disc protruding from the middle of the electrode shell into the water inlet self-sealing embedded groove, where the rubber gasket at the bottom surface of the disc protruding from the middle of the electrode shell ensures the tightness of the electrode structure shell and the water bag, thus preventing the conductive liquid in the water bag from leaking; then, tightening a self-locking structure nut outside the water inlet to strengthen integrity of the water inlet and the electrode structure;

S5, when a water bag filled with an ionic solution is selected in the S4, completing an assembly work on a well in the S4; when an unfilled liquid water bag is selected, completing the S4 underground, taking materials nearby, and carrying out the assembly work of the S4 after mine water is filled underground;

S6, transporting the electrode and the water bag assembled in the S4 to a fracturing working face, connecting the high-voltage cable to the upper end of the high-voltage electrode, connecting a grounding cable at the fixing ring in the middle of the electrode shell, and connecting a whole electric pulse equipment system to complete the preparation work before the electric pulse discharge;

S7, fixing the assembled self-sealing water bag high-voltage electric pulse electrode structure on the assembly rod at a position corresponding to the optimal electrode depth in the fracturing design; after the high-voltage cable is connected, and after an assembled structure of the assembled self-sealing water bag high-voltage electric pulse electrode structure and the assembly rod extends into the drilled fracturing hole, propping the self-supporting fixing bracket at the end of assembly rod up to fix the assembled structure in the drilled fracturing hole, thereby preventing the assembled structure from slipping down; when a fracturing effect of a single electrode in the fracturing hole is not good, fixing the multiple water-filled self-sealing water bags and the multiple assembled self-sealing water bag high-voltage electric pulse electrode structures on the assembly rod at intervals, ensuring that one self-sealing water bag without electrodes is filled between each two electrode structures, thus realizing phased hole sealing between electrodes;

S8, after all the preparation work is completed, turning on the power switch, observing the voltage value of the charging power supply, and determining the charging voltage (5 kV to 10 kV) according to the actual situation; when the predetermined voltage value is reached, turning off the power switch and turning on the high-voltage electric pulse switch to discharge, where at the moment of discharge, the tip of the electrode is pulsed in the water, and the formed plasma channel penetrates the two poles of the electrode and expands continuously, and at the same time, the bubble pulsation phenomenon is generated, under the joint action of both, a shock wave is formed, and a high-energy shock wave instantly breaks the water bag; uniformly and losslessly transferring energy to the surrounding rock by a water shock wave propagating in the water, achieving the purpose of fracturing;

S9, after the discharge, disassembling the assembly rod, and peeping and observing the fracturing effect by means of drilling hole; when the fracturing effect is not ideal, repeating the above steps S1-S8 circularly.

The embodiment has following beneficial effects.

Firstly, when underground rock strata fracturing, especially the hard roof fracturing, inevitably involves drilling holes from the bottom to the roof. An electric pulse fracturing technology based on electro-hydraulic effect needs to generate a plasma channel formed by pulse discharge in the water to penetrate the two poles of the electrode and expand continuously, thus forming a shock wave. Therefore, according to the designed self-sealing water bag electric pulse electrode device, combined with the assembly rod, a hole sealing problem after injecting the water and the conductive liquid into the blasting hole may be realized conveniently and quickly.

Secondly, when the thickness of the fractured stratum is large, the fracturing effect of the single electrode in the fracturing hole may no longer meet needs. Based on the designed assembly rod, multiple water bag electrode structures may be combined in series, and at the same time, each water bag without electrodes between each two high-voltage electric pulse electrode structures of each self-sealing water bag is used for filling and the phased plugging, so as to realize the multi-electrode synchronous discharge layered fracturing and the high-efficiency fracturing of the rock stratum.

Thirdly, the device and the method for electric pulse discharge fracturing based on the disclosure are adopted to replace explosive blasting and hydraulic fracturing which are popular at present. An existing underground drilling rig is used for drilling, so that a whole fracturing operation is simpler and more convenient, and a cost is lower. Meanwhile, compared with the explosive blasting, the device and the method based on the disclosure are safer, and may also be popularized and applied in gassy mines, with a wider application range, compared with the hydraulic fracturing, the cost is lower, water saving and environmental protection is realized.

Fourthly, by adjusting an energy-gathering drilling direction of the electrode and a depth of the electrode in the blasting hole, a focus control of a position and a direction of electric pulse discharge energy may be realized, and high-efficiency fracturing may be realized.

DETAILED DESCRIPTION OF THE EMBODIMENTS

Figure 1:
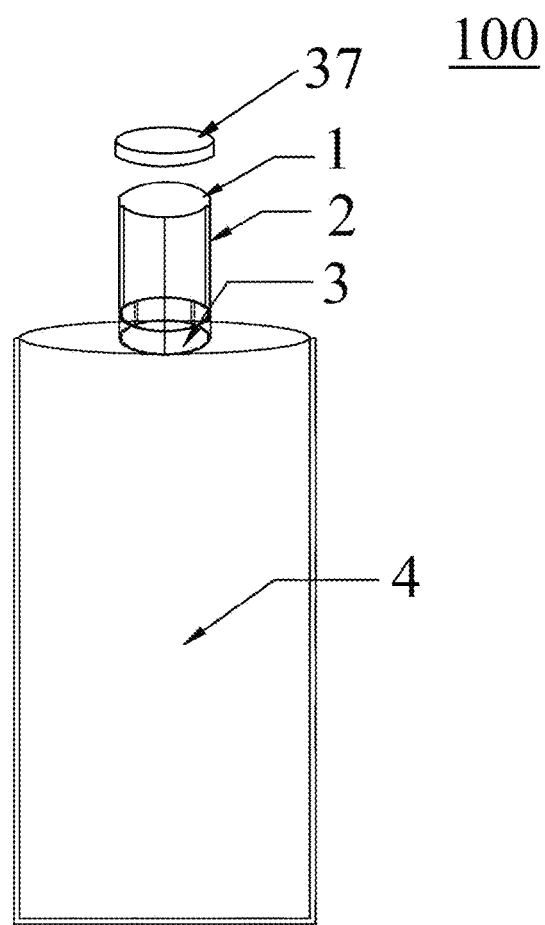
FIG. 1 is a schematic structural view of a self-sealing water bag designed by the disclosure.
Figure 2A:
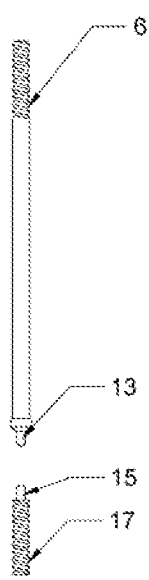
FIG. 2A is an exploded schematic view of a high-voltage electrode structure according to the disclosure.
Figure 2B:
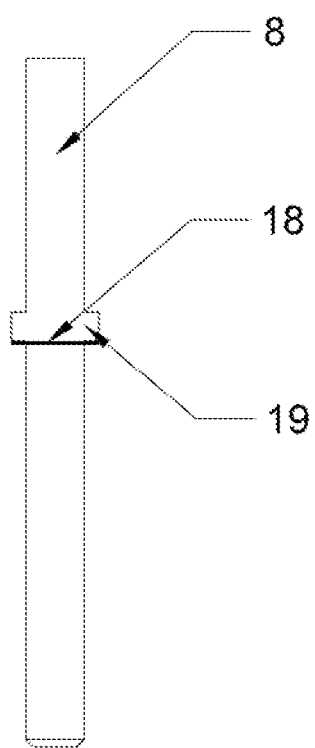
FIG. 2B is a schematic view of a polypropylene insulating sleeve according to the disclosure.
Figure 2C:
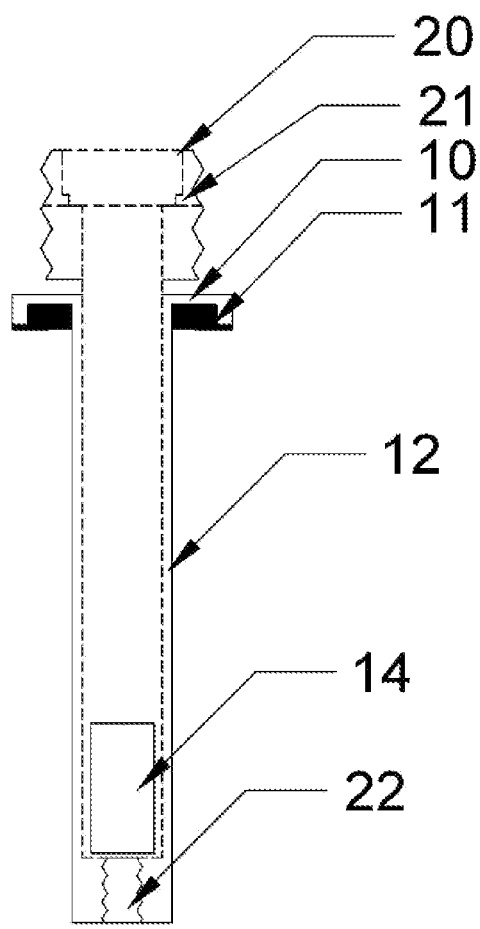
FIG. 2C is a schematic view of a high-voltage electrode shell according to the disclosure.
Figure 2D:
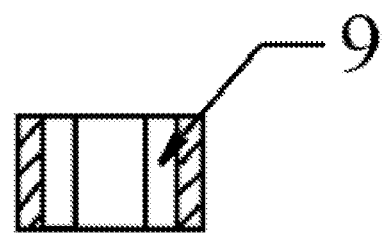
FIG. 2D is a schematic view of a fixing nut according to the disclosure.
Figure 3:
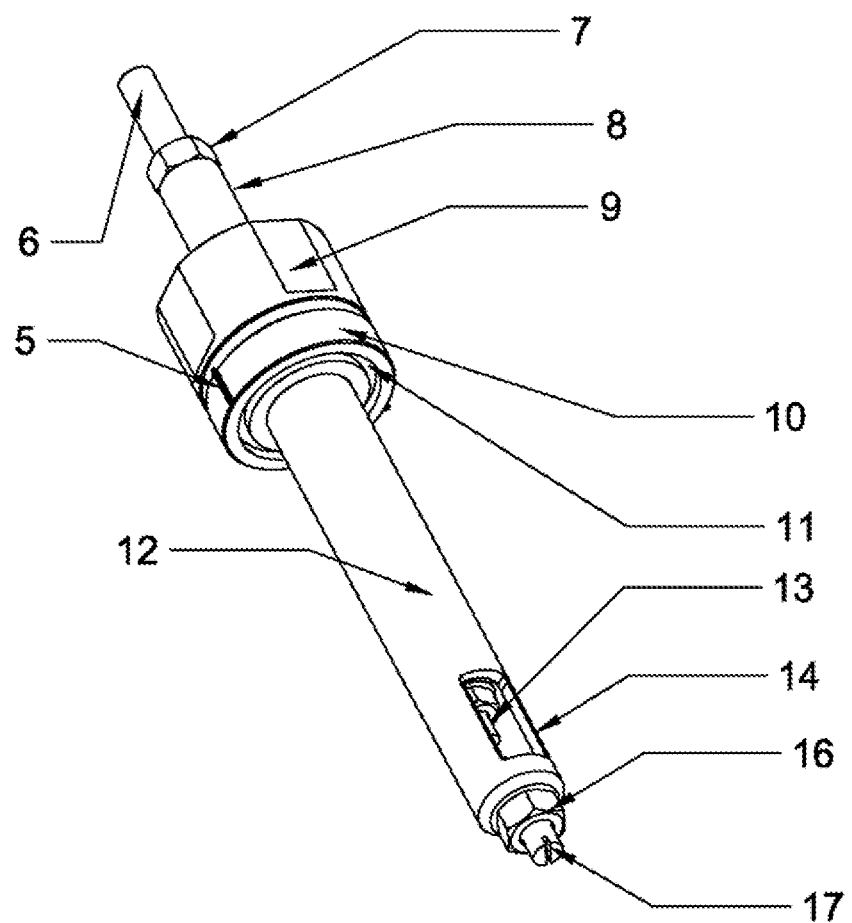
FIG. 3 is an assembled high-voltage electric pulse electrode structure.
Figure 4:
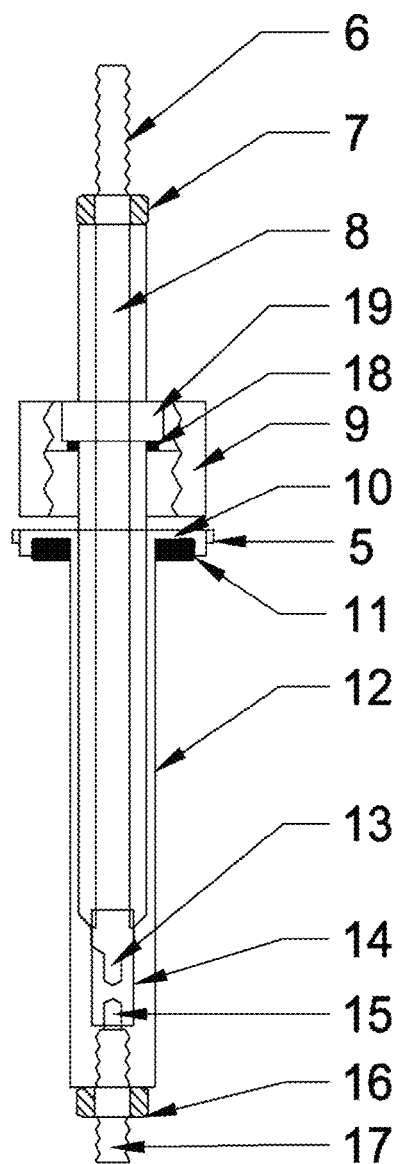
FIG. 4 is a sectional view of an assembled high-voltage electric pulse electrode along a central axis.

The disclosure will be further illustrated by following embodiments, but not limited to the following embodiments.

Embodiment

As shown in FIGS. 1 to 8, a high-voltage electric-pulse fracturing device for hard roof of coal mine based on a self-sealing water bag includes a charging power supply 23, an energy storage capacitor 25, a current limiting protection resistor 24, a power switch 27, a high-voltage electric pulse switch 28 and a gas gap switch 26. When in use, all components are connected through a high-voltage cable 29 to complete an assembly of a high-voltage electric pulse fracturing equipment system. Correspondingly, auxiliary devices are provided, such as an assembly rod 30 which is matched with a self-sealing water bag electrode device. When in use, the high-voltage cable 29 is used to connect an assembled self-sealing water bag high-voltage electric pulse electrode structure, a thread upper end 6 of a high-voltage electrode and the gas gap switch 26 are connected through the high-voltage cable 29, and the high-voltage cable 29 passes through the hollow assembly rod 30.

The assembly rod 30 matched with the self-sealing water bag high-voltage electric pulse electrode structure designed by this disclosure has a main body of a hollow high-strength steel pipe. The high-voltage cable 29 connected to an electrode may pass through the assembly rod which protects the high-voltage cable 29 from being damaged during electric pulse discharge. A top end of the assembly rod 30 may extend into a bottom of a fracturing hole 35, so the assembled self-sealing water bag high-voltage electric pulse electrode structure may be fixed at an appropriate position on the assembly rod 30, corresponding to an optimal electrode depth in a fracturing design. When a fracturing effect of a single electrode in a single hole fails to meet a requirement, multiple water-filled self-sealing water bags 31 and multiple assembled self-sealing water bag high-voltage electric pulse electrode structures 32 may be fixed on the assembly rod 30 at intervals.

After the high-voltage cable 29 is connected, an assembled structure of the assembled self-sealing water bag high-voltage electric pulse electrode structure 32 and the assembly rod 30 is inserted into a drilled fracturing hole 35, and a self-supporting fixed bracket 33 at the end of the assembly rod is supported to fix the assembled structure in the drilled fracturing hole 35 to prevent it from slipping.

The self-sealing water bag 100 of the present disclosure includes a water bag body 4 and a sealing device. The water-filled self-sealing water bag 31 is elongate and cylindrical after water injection, and a diameter is 2-4 mm smaller than the fracturing hole 35 drilled by a drill in a coal mine underground. The water-filled self-sealing water bag 31 may be freely replaced in a factory according to mine production needs, so as to ensure that the assembled self-sealing water bag high-voltage electric pulse electrode structure 32 and the assembly rod 30 may be smoothly sent to a designated position in the drilled fracturing hole 35. The sealing device is mainly a self-sealing water bag water inlet 1 at an upper end of a bag body and is made of hard polyethylene and has a conventional thread shape outside, and a matching nut may be self-fastened and sealed. An inner wall of the self-sealing water bag water inlet 1 is provided with a water inlet embedded groove guide rail 2, and a bottom of the water inlet is provided with a water inlet self-sealing embedded groove 3.

After production of the water bag is completed, tap water or NaCl solutions with different concentrations, $CaCl_2$) solutions with different concentrations, $AlCl_3$ solutions with different concentrations, etc. required for an underground blasting effect of the coal mine may be pre-filled in a factory. After the conductive liquid is fully filled, the water inlet 1 is sealed by a matching cover 37. An optimal type and an optimal concentration of the solution may be determined by conducting experiments in a laboratory according to differences of underground fractured strata. Specific operations are as follows: cores are selected in an underground operating stratum, a fracturing test of rock samples is carried out in the laboratory, pulse energy generated by different conductive liquids is monitored in a discharge process, and differences of solution types and concentrations on the fracturing effect of the rock samples are analyzed, thereby a best conductive liquid is analyzed that may be used for rock breaking. Accordingly, the water bag may also be directly transported to the underground after the production is completed, and local materials are taken before an underground application, and the mine water is selected as the conductive liquid.

The high-voltage electric pulse electrode structure used in this disclosure is as follows: an electrode shell 12 is a high-strength steel hollow circular tube, and a polypropylene insulating sleeve 8 covering the electrode passes through the electrode shell 12. The electrode shell 12 includes three cylinders with different outer diameters. An upper end of the electrode shell 12 is provided with an external thread 21 at the upper end of the electrode shell for fixing the polypropylene insulating sleeve 8 in cooperation with a polypropylene insulating sleeve fixing nut 9, and a step groove 20 is provided in an interior to fit a polypropylene fixing disc 19 at a middle-upper part of the polypropylene insulating sleeve tube for fixing a high-voltage electrode. A middle second cylinder is a disc 10 protruding from middle of the electrode shell, which is a thin disc with a diameter twice that of a third cylinder. The disc 10 protruding from the middle of the electrode shell 12 is provided with two electrode shell positioning sliders 5 at two ends along a radial direction used to cooperate with the water inlet embedded groove guide rail 2 of the water bag to be embedded into the water bag, and to be embedded into the water inlet self-sealing embedded groove 3 for sealing. A lower end face of the disc 10 protruding from the middle of the electrode shell is slotted and provided with a rubber gasket groove 11 for placing a rubber gasket. An outer side of the lower third cylinder of the electrode shell 12 has a smooth structure, and an internal thread 22 is provided at a lower end of the electrode shell at a center of the bottom for fixing a grounding electrode 15.

The high-voltage electrode is arranged in the polypropylene insulating sleeve 8, and the high-voltage electrode protrudes from one end of the polypropylene insulating sleeve 8 by 2-4 mm, and this extending part is called a discharge electrode 13, and a diameter of the extending part is 2-4 mm, and a tip is chamfered by 45°. An other end of the electrode extends out of the polypropylene insulating sleeve, and an M8-sized thread is laid on an extending part and is called a thread upper end 6 of a high-voltage electrode for connecting the high-voltage cable 29 for electrification.

The high-voltage electrode arranged in the polypropylene insulating sleeve 8 is embedded in the step groove 20 at the upper end of the fixed electrode shell through the polypropylene fixing disc 19 and a polypropylene insulating sleeve rubber gasket 18 in the middle of the polypropylene insulating sleeve 8, and then fixed in the electrode shell 12 through a combination of the polypropylene insulating sleeve fixing nut 9 and the external thread 21 at the upper end of the electrode shell. The polypropylene insulating sleeve 8 is mainly used for insulation protection. The polypropylene fixing disc 19 at the upper part of the polypropylene insulating sleeve 8 may be perfectly embedded into the step groove 20 on the upper end of the electrode shell, and with the polypropylene insulating sleeve fixing nut 9, so as to fix the high-voltage electrode, thereby preventing the high-voltage electrode from shaking axially and radially in the electrode shell 12. The polypropylene insulating sleeve rubber gasket 18 between the polypropylene fixing disc 19 and the step groove 20 at the upper end of the electrode shell may strengthen fixation of the electrode, and meanwhile ensure tightness of the structure to prevent the water from invading the upper part of the electrode when the electrode is in the water.

A lower part of the third cylinder of the electrode shell 12 is provided with two opposite rectangular windows 14 of the electrode shell used to expose the discharge electrode 13 and the ground electrode 15. The ground electrode 15 and that discharge electrode 13 are required to be between the rectangular windows 14 of the electrode shell, in which a cross-sectional size of a hollow hole is 3 mm×10 mm, so as to realize shock wave energy focusing of the electrode structure.

In the electrode shell 12, the grounding electrode 15 is screwed in through the internal thread 22 at the lower end of the electrode shell, and fixed at the bottom of the electrode shell by a grounding electrode fixing nut 16. In the electrode shell 12, the grounding electrode 15 and the discharge electrode 13 are oppositely arranged along an axis in the hollow hole of the electrode shell. A distance between the grounding electrode 15 and the discharge electrode 13 may be adjusted by adjusting a screwing length of the internal thread 22 at the lower end of the electrode shell, so as to realize adjustments of the discharge energy and a rock breaking effect. The distance between the two electrodes may be 1 mm to 5 mm for testing.

A shock wave generated by the grounding electrode 15 and the discharge electrode 13 is a key to rock breaking, and a discharge channel is determined by the distance between the two electrodes. During a research, an impact on a high-voltage electric pulse breakdown time and a shock wave wavefront time may be achieved by changing the distance between the two electrodes, resulting in different pulse action times, which in turn affects the fracturing effect. Before underground hard roof fracturing, electrical pulse monitoring and analysis are carried out in the laboratory, so a quantitative relationship between electrode spacing, released energy and rock breaking effect is obtained (a best quantitative relationship is obtained through an experimental test), and a best electrode distance suitable for the underground hard roof fracturing is obtained.

Assembly of the assembled self-sealing water bag high-voltage electric pulse electrode structure 32, the electrode structure and the self-sealing water bag is as follows. After the water bag is filled with the conductive liquid, the assembled electrode structure is inserted into the water bag through the self-sealing water bag water inlet 1. The disc 10 protruding from the middle of the electrode shell has two electrode shell positioning sliders at two ends along the radial direction, and the positioning sliders may insert the assembled electrode structure into the water bag along the water inlet embedded groove guide rail 2. When the electrode structure slides into the bottom of the water inlet, the electrode structure is rotated, so that the disc 10 protruding from the middle of the electrode shell may be embedded into the water inlet self-sealing embedded groove 3, and the rubber gasket protruding from the lower end face of the disc protruding from the middle of the electrode shell may ensure tightness of the electrode structure shell and the water bag, and prevent the conductive liquid in the water bag from leaking. Then, a self-locking structure nut outside the water inlet is tightened to strengthen integrity of the water inlet and the electrode structure.

Figure 9:
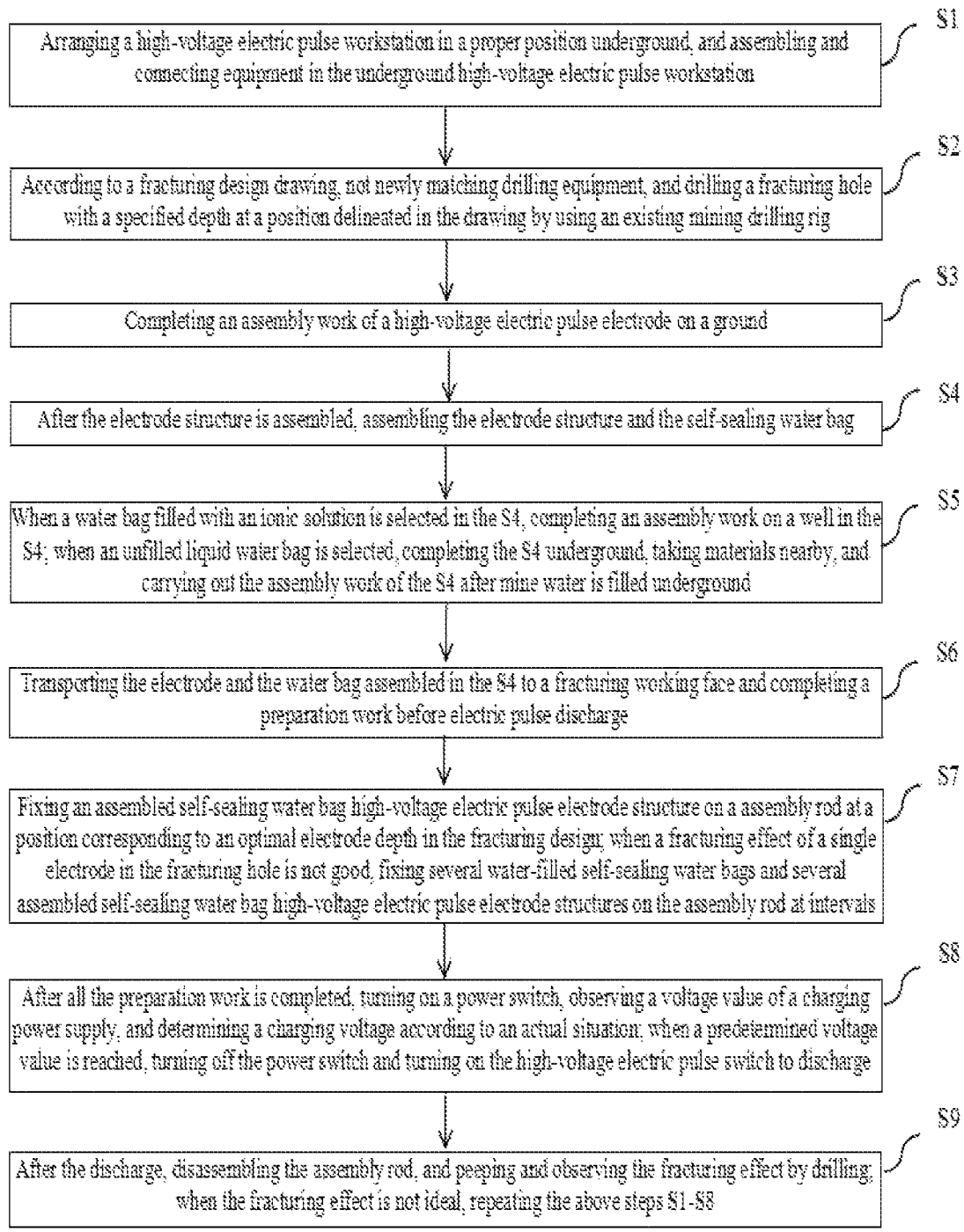
FIG. 9 is a flowchart of an electric-pulse fracturing method for hard roof of coal mine based on a self-sealing water bag according to the disclosure.

As shown in FIG. 9, the disclosure also provides a mining high-voltage electric pulse hard roof fracturing method based on the self-sealing water bag high-voltage electric pulse electrode structure designed by the disclosure, specifically including following steps.

S1, a high-voltage electric pulse workstation 36 is arranged in a underground proper position, and the high-voltage cable 29, the energy storage capacitor 25, the current limiting protection resistor 24, the power switch 27, the high-voltage electric pulse switch 28, the gas gap switch 26 and the like are transported to the underground proper position, and the equipment is assembled and connected in the underground high-voltage electric pulse workstation 36.

S2, according to a fracturing design drawing, there is no need to equip the drilling equipment, and the fracturing hole 35 is drilled with a specified depth at a position delineated in the drawing by using an existing mining drilling rig.

Figure 5:
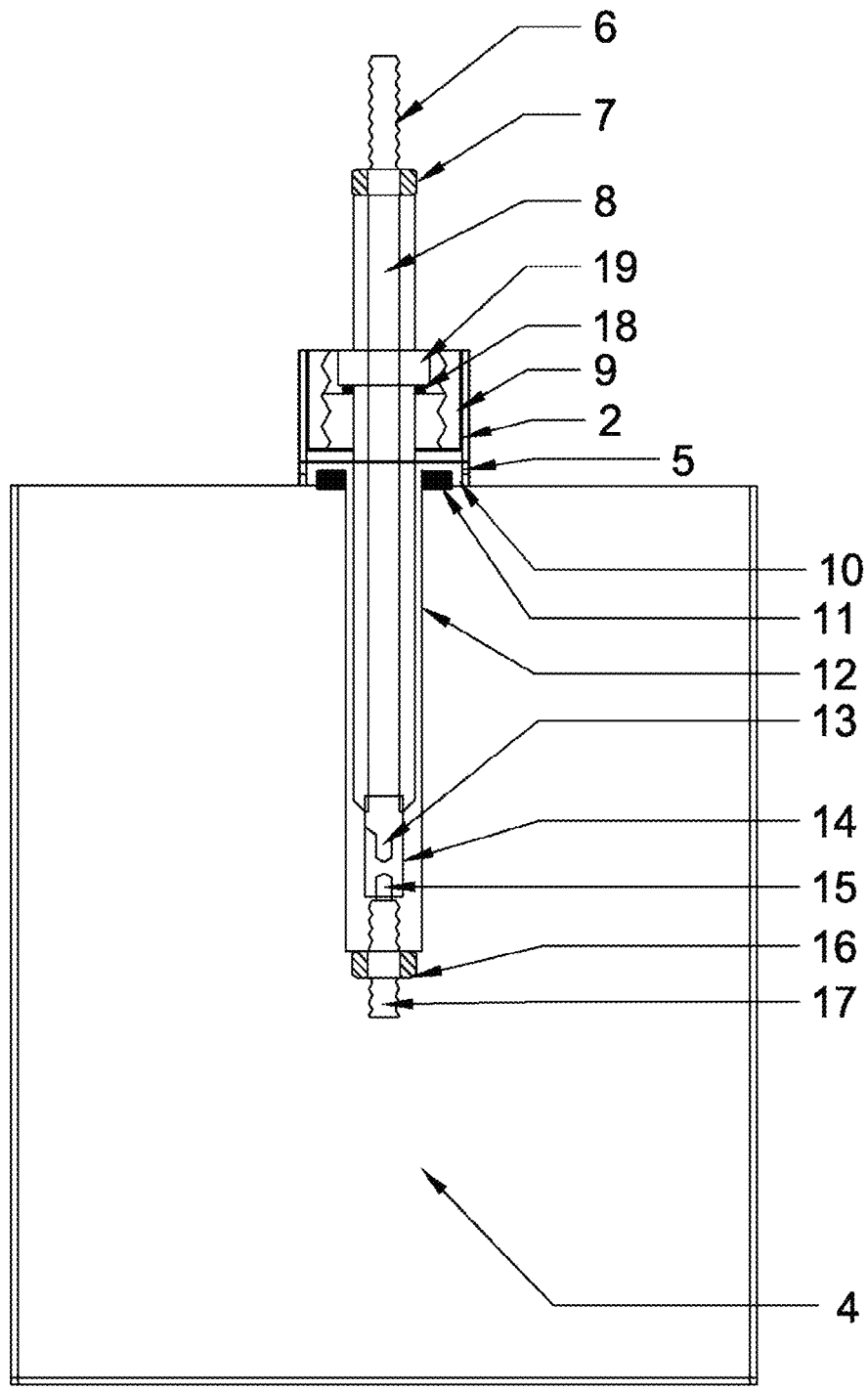
FIG. 5 is the assembled high-voltage electric pulse electrode structure of the self-sealing water bag.
Figure 6:
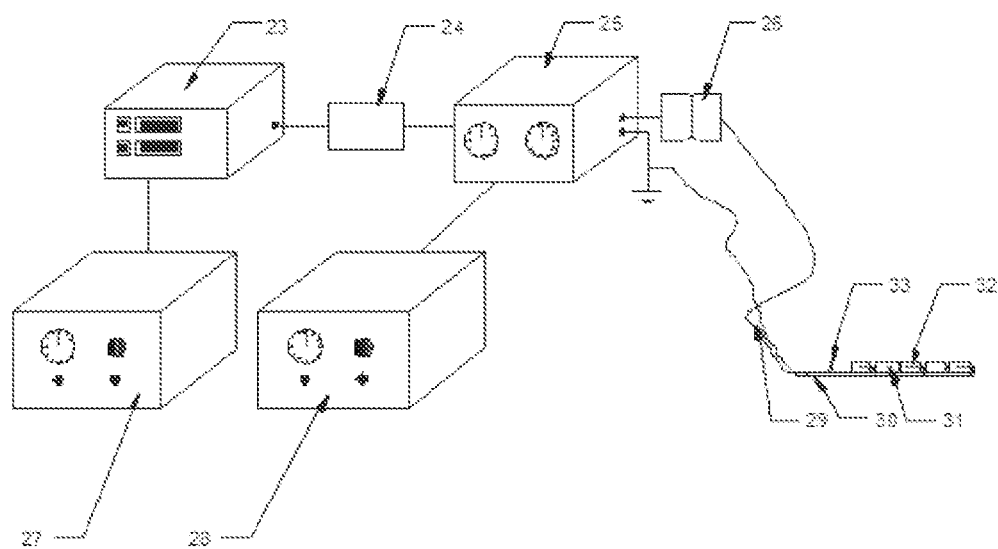
FIG. 6 is a schematic diagram of a connected whole high-voltage electric pulse fracturing workstation.
Figure 7:
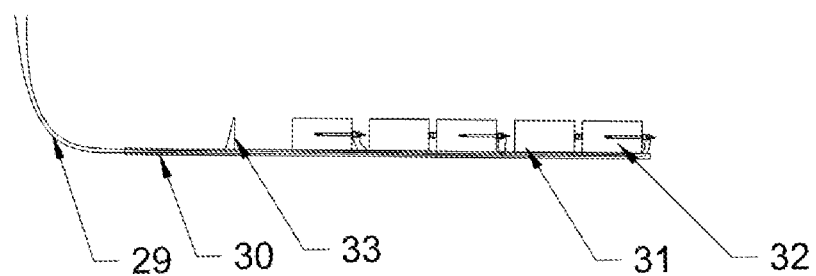
FIG. 7 is a multi-electrode assembly structure after a matching assembly rod is assembled.

S3, the electrode structure and the self-sealing water bag are combined after completing an assembly of the high-voltage electric pulse electrode structure on a ground. The assembled electrode penetrates into the water bag body 4 from the self-sealing water bag water inlet 1, and the electrode shell positioning sliders at two ends along the radial direction of the disc 10 protruding from the middle of the electrode shell may penetrate into the water inlet 1 along the water inlet embedded groove guide rail 2. When the disc 10 protruding from the middle of the electrode shell penetrates into the water inlet self-sealing embedded groove 3 at the bottom of the water inlet, the disc 10 protruding from the middle of the electrode shell rotates counterclockwise, and the disc 10 protruding from the middle of the electrode shell is rotationally embedded and locked in the water inlet self-sealing embedded groove 3, thus playing a sealing role with the rubber gasket in the rubber gasket groove 11 at the lower end face of the disc 10 protruding from the middle of the electrode shell to achieve a design purpose of self-sealing. As shown in FIG. 5.

S4, when a water bag filled with an ionic solution in advance is selected for the water bag body 4 in the S3, an assembly work in the S3 is completed on the ground. When an unfilled liquid water bag is selected, the S3 is completed underground, materials are taken nearby, and the assembly work of the S3 is carried out after the mine water is filled underground.

S5, the assembled self-sealing water bag high-voltage electric pulse electrode structure 32 in the S3 is transported to a working face, the thread upper end 6 of the high-voltage electrode is connected with the gas gap switch 26 through the high-voltage cable 29, and the grounding electrode 15 is grounded. The high-voltage cable 29 passes through the hollow assembly rod 30 device and is connected to an electric pulse equipment system of the whole high-voltage electric pulse workstation 36 to complete a preparation work before electric pulse discharge.

Figure 8:
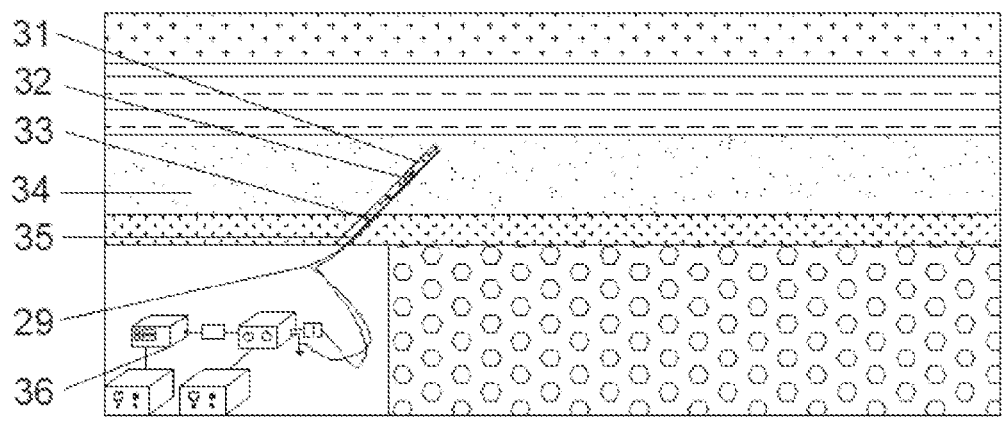
FIG. 8 is a schematic diagram of underground high-voltage electric pulse fracturing.

S6, the assembled self-sealing water bag high-voltage electric pulse electrode structure 32 is simply fixed at the appropriate position on the assembly rod 30 to correspond to the optimal electrode depth in the fracturing design. As shown in FIG. 8, a hard stratum is thick, and the fracturing effect of the single electrode in the single fracturing hole 35 is average. Multiple water-filled self-sealing water bags 31 (without electrodes) and multiple assembled self-sealing water bag high-voltage electric pulse electrode structures 32 are fixed on the assembly rod 30 at intervals, so as to ensure that each self-sealing water bag 31 (without electrodes) is filled between each two assembled self-sealing water bag high-voltage electric pulse electrode structures. After the high-voltage cable 29 is connected, the assembled self-sealing water bag high-voltage electric pulse electrode structure 32 and the assembly rod 30 is inserted into the drilled fracturing hole 35, and the self-supporting fixing bracket 33 at the end of the assembly rod is propped up to fix the assembled structure in the drilled fracturing hole 35 to prevent the assembled structure from slipping down.

S7, after all the preparation work is completed, the power switch 27 is turned on, a voltage value of the charging power supply 23 is observed, and the charging voltage (5 kV to 10 kV) is determined according to an actual situation. When a predetermined voltage value is reached, the power switch 27 is turned off and the high-voltage electric pulse switch 28 is turned on to discharge. After the discharge, a residual voltage is leaked. At a moment of discharge, the discharge electrode 13 and the grounding electrode 15 are pulsed in the water, and a formed plasma channel penetrates two poles of the electrode and expands continuously, and at the same time, a bubble pulsation phenomenon is generated. Under a joint action of the two phenomena, a directional shock wave is formed, and a high-energy shock wave instantly breaks the water bag. A water shock wave propagating in the water uniformly and losslessly transfers energy to a surrounding rock around the fracturing hole 35, thereby achieving a purpose of fracturing.

S8, after the discharge, the assembly rod 30 is removed, and the fracturing effect is peeped and observed by means of drilling hole. When the fracturing effect is not ideal, the above steps S1-S7 are circularly repeated.

What is claimed is:

1. An electric-pulse fracturing device for hard roof of coal mine, comprising:
    a power switch,
    a charging power supply,
    a current limiting protection resistor,
    an energy storage capacitor and a high-voltage electric pulse switch connected in sequence, wherein the energy storage capacitor is connected with an end of a gas gap switch; wherein an other end of the gas gap switch is connected with assembled self-sealing water bag high-voltage electric pulse electrode structures through a high-voltage cable, and the assembled self-sealing water bag high-voltage electric pulse electrode structures are fixed through an assembly rod and connected with the high-voltage cable;
    wherein each of the assembled self-sealing water bag high-voltage electric pulse electrode structures comprises a self-sealing water bag and an electrode structure capable of focusing shock wave energy, a plurality of water-filled self-sealing water bags and the plurality of assembled self-sealing water bag high-voltage electric pulse electrode structures are alternately fixed on the assembly rod;
    wherein the assembly rod has a main body of a hollow high-strength steel pipe;
    the high-voltage cable connecting a discharge electrode and a grounding electrode passes through the assembly rod to protect the high-voltage cable from being damaged during electric pulse discharge;
    a top end of the assembly rod is provided with a self-supporting fixing bracket for extending into a bottom of a fracturing hole; and
    the assembled self-sealing water bag high-voltage electric pulse electrode structures are fixed at an appropriate position on the assembly rod, ensuring that the assembled self-sealing water bag high-voltage electric pulse electrode structures correspond to an optimal electrode depth in a fracturing design when the assembly rod extends into the fracturing hole.

2. The electric-pulse fracturing device for hard roof of coal mine according to claim 1, wherein:
    the self-sealing water bag comprises a water bag body and a sealing structure, and the water bag body is elongate and cylindrical after water injection;
    in order to ensure that the water bag body is smoothly sent to a designated position in the fracturing hole, a diameter of the water bag body is 2-4 millimeters (mm) smaller than a diameter of the fracturing hole drilled by a coal mine underground drilling rig, and the diameter of the water bag body is adjustable according to a model of the coal mine underground drilling rig and a drilling diameter of the fracturing hole in a production process;
    the sealing structure comprises a water inlet at an upper end of the water bag body;
    the water inlet is made of hard polyethylene, and an outer wall of the water inlet is in a conventional thread shape, and a matching cover is fastened to the water inlet and configured to seal the water inlet; and
    an inner wall of the water inlet is provided with a water inlet embedded groove guide rail, and a bottom of the water inlet is provided with a self-sealing embedded groove for embedding a disc protruding from a middle of an electrode shell.

3. The electric-pulse fracturing device for hard roof of coal mine according to claim 2, wherein:
    the electrode structure is embedded in the self-sealing embedded groove of the water inlet of the self-sealing water bag to focus the shock wave energy, and the electrode structure capable of focusing the shock wave energy comprises a high-voltage electrode, a grounding electrode, a polypropylene insulating sleeve, a first rubber gasket arranged on the polypropylene insulating sleeve, the electrode shell, and a polypropylene insulating sleeve fixing nut;

after the water bag body is filled with a conductive liquid, the electrode structure is inserted into the water bag body through the water inlet;

the disc protruding from the middle of the electrode shell is provided with two electrode shell positioning sliders at two ends along a radial direction;

the two electrode shell positioning sliders slide along the water inlet embedded groove guide rail so as to insert the electrode structure into the water bag body; and when the electrode structure slides into the bottom of the water inlet, the electrode structure is configured to be rotated so that the disc protruding from the middle of the electrode shell is embedded into the self-sealing embedded groove of the water inlet, and a second rubber gasket is arranged on a lower end face of the disc protruding from the middle of the electrode shell.

4. The electric-pulse fracturing device for hard roof of coal mine according to claim 3, wherein the electrode structure capable of focusing the shock wave energy is as follows:

the high-voltage electrode is arranged in the polypropylene insulating sleeve, and the polypropylene insulating sleeve and the electrode shell are firmly connected through a polypropylene fixing disc and a step groove on an upper end of the electrode shell, and the polypropylene insulating sleeve is arranged between the high-voltage electrode and the electrode shell to play an insulating protection role; and the first rubber gasket is sleeved at a contact position of the polypropylene insulating sleeve and the electrode shell to strengthen a fastening between the polypropylene insulating sleeve and the electrode shell and ensure tightness, and prevent water in the water bag body from invading an upper wiring position of the discharge electrode when a lower end of the discharge electrode is immersed in the water;

the electrode shell is a high-strength steel hollow circular tube, and an inner wall of a top end of the electrode shell is provided with the step groove for embedding and fixing the polypropylene fixing disc at a middle-upper part the polypropylene insulating sleeve, and an outer wall of the top end of the electrode shell is provided with an external thread for connecting the polypropylene insulating sleeve fixing nut;

a diameter of the disc protruding from the middle of the electrode shell is equal to an inner diameter of the water inlet so as to fix the high-voltage electrode with the self-sealing embedded groove at the bottom of the water inlet of the water bag body and realizing sealing of the water bag body, and a bottom surface of the disc is slotted for placing the second rubber gasket to seal the water inlet, and two small circular-arc protrusions serving as the two electrode shell positioning sliders of the electrode shell is arranged at the two ends along the radial direction;

a lower part of the electrode shell is provided with two opposite rounded rectangular windows, and a discharge space at the lower end of the discharge electrode is exposed to realize energy focusing at a moment of discharge; cross-sectional dimensions of the two opposite rounded rectangular windows are 2 mm×10 mm, 3 mm×10 mm or 4 mm×10 mm;

the high-voltage electrode is arranged in the polypropylene insulating sleeve, the high-voltage electrode comprises a thread upper end for connecting the high-voltage cable, and a bottom end extending out of the polypropylene insulating sleeve by 2-4 mm and forming the discharge electrode; and the grounding electrode penetrates a lower end face of the electrode shell and is fixed in the electrode shell through threads, and the high-voltage electrode and the grounding electrode are oppositely arranged along an axis in the two opposite rounded rectangular windows of the electrode shell, and a distance between the grounding electrode and the high-voltage electrode is adjustable through the threads, and the distance between the grounding electrode and the high-voltage electrode is in a range of 1 mm-10 mm.

5. A method of using the electric-pulse fracturing device according to claim 4, comprising:

connecting the charging power supply, the energy storage capacitor, the current limiting protection resistor, the power switch, the high-voltage electric pulse switch, the gas gap switch and the assembled self-sealing water bag high-voltage electric pulse electrode structures through the high-voltage cable to complete a construction preparation work of a high-voltage electric pulse workstation connecting the high-voltage cable which passes through the assembly rod in the high-voltage electric pulse workstation;

putting the assembled self-sealing water bag high-voltage electric pulse electrode structures into the fracturing hole in cooperation with the assembly rod, fixing the assembled self-sealing water bag high-voltage electric pulse electrode structures into the fracturing hole by the self-supporting fixing bracket at the top end of the assembly rod;

turning on the power switch, and observing a voltage value of the charging power supply, determining a charging voltage according to an actual situation;

when a predetermined voltage value is reached, turning off the power switch and turning on the high-voltage electric pulse switch to discharge, wherein at a moment of discharge, the lower end of the discharge electrode is pulsed in the water, and a formed plasma channel penetrates two poles of the high-voltage electrode and expands continuously, and a bubble pulsation phenomenon is generated, under a joint action of the formed plasma channel and the bubble pulsation phenomenon, a shock wave is formed, and a high-energy shock wave instantly breaks the water bag body; and uniformly and losslessly transferring energy to surrounding rock by a water shock wave propagating in the water, achieving a purpose of fracturing.

6. The method according to claim 5, comprising:

S1, arranging the high-voltage electric pulse workstation in a proper position underground: transporting, assembling and connecting the high-voltage cable, the energy storage capacitor, the current limiting protection resistor, the power switch, the high-voltage electric pulse switch and the gas gap switch to the proper position underground;

S2, according to the fracturing design drilling the fracturing hole with a specified depth at the designated position by the coal mine underground drilling rig;

S3, assembling the electrode structure on a ground:

putting the high-voltage electrode arranged in the polypropylene insulating sleeve into the electrode shell, wherein the polypropylene fixing disc protruding from the middle-upper part of the polypropylene insulating sleeve is embedded in the step groove on the upper end of the electrode shell;

fixing the high-voltage electrode in the electrode shell to prevent the high-voltage electrode from shaking radially, wherein the first rubber gasket at the contact position between the high-voltage electrode and the electrode shell ensures connection tightness and prevents the water from invading the upper wiring position of the discharge electrode when the lower end of the discharge electrode is in the water;

fastening the high-voltage electrode penetrated into the electrode shell via the polypropylene insulating sleeve fixing nut and an external thread of a first cylinder at the upper end of the electrode shell, connecting the polypropylene insulating sleeve fixing nut and the high-voltage electrode into a whole to prevent the polypropylene insulating sleeve from slipping and shaking along an axial direction of the electrode shell;

screwing the grounding electrode into the electrode shell through an internal thread at a bottom of the electrode shell, and oppositely arranging the grounding electrode and the discharge electrode along an axis in a hollow hole of the electrode shell, and adjusting a distance between the grounding electrode and the discharge electrode by adjusting a screwing length of the grounding electrode, and then fixing the grounding electrode at the bottom of the electrode shell with a grounding electrode fixing nut after the grounding electrode is adjusted to an optimal position;

S4, after the electrode structure is assembled, assembling the electrode structure and the self-sealing water bag:

after the water bag body is filled with the conductive liquid, inserting the electrode structure into the water bag body by the two electrode shell positioning sliders at the two ends along the radial direction of the disc protruding from the middle of the electrode shell through the water inlet along the water inlet embedded groove guide rail;

when the disc protruding from the middle of the electrode shell slides into the bottom of the water inlet, rotating the electrode structure, embedding two circular-arc protrusions of the disc protruding from the middle of the electrode shell into the self-sealing embedded groove of the water inlet, wherein the second rubber gasket at the lower end face of the disc in the middle of the electrode shell ensures the tightness of the electrode shell and the water bag body, and prevents the conductive liquid in the water bag body from leaking; and tightening a self-locking structure nut outside the water inlet to strengthen integrity of the water inlet and the electrode structure;

S5, in a case that a water bag body filled with the conductive liquid is selected in the step S4, completing an assembly work in the step S4 on a well; and in a case that the water bag body is not filled with the conductive liquid on the well, filling mine water into the water bag body, and completing the assembly work of the step S4 underground;

S6, transporting the electrode structure and the self-sealing water bag assembled in the step S4 to a fracturing working face, connecting the high-voltage cable to the thread upper end of the high-voltage electrode, connecting a grounding cable at the disc protruding from the middle of the electrode shell, and connecting a whole electric pulse equipment system to complete the construction preparation work of the high-voltage electric pulse workstation before the electric pulse discharge;

S7, fixing the assembled self-sealing water bag high-voltage electric pulse electrode structures on the assembly rod at a position corresponding to the optimal electrode depth in the fracturing design;

after the high-voltage cable is connected to the high-voltage electrode, and after the assembled self-sealing water bag high-voltage electric pulse electrode structures and the assembly rod is put into the fracturing hole, propping the self-supporting fixing bracket at the end of assembly rod up to fix the assembled self-sealing water bag high-voltage electric pulse electrode structures in the fracturing hole, so as to prevent the assembled self-sealing water bag high-voltage electric pulse electrode structures from slipping down; wherein the plurality of water-filled self-sealing water bags and the assembled self-sealing water bag high-voltage electric pulse electrode structures are alternately fixed on the assembly rod at intervals;

S8, turning on the power switch, observing the voltage value of the charging power supply, and determining the charging voltage according to the actual situation; when the predetermined voltage value is reached, turning off the power switch and turning on the high-voltage electric pulse switch to discharge, wherein at the moment of discharge, the lower end of the discharge electrode is pulsed in the water, and the formed plasma channel penetrates the two poles of the high-voltage electrode and expands continuously, and the bubble pulsation phenomenon is generated, under the joint action of the formed plasma channel and the bubble pulsation phenomenon, the shock wave is formed, and the high-energy shock wave instantly breaks the water bag body; and uniformly and losslessly transferring energy to the surrounding rock by the water shock wave propagating in the water, achieving the purpose of fracturing; and S9, after the discharge, disassembling the assembly rod, and peeping and observing a fracturing effect by a drilling hole; when the fracturing effect is not ideal, repeating above steps S1-S8 circularly.

7. The method according to claim 6, wherein after production of the self-sealing water bag is completed, the conductive liquid required by an underground blasting of the coal mine is filled into the self-sealing water bag in a factory, and the conductive liquid comprises one of tap water, the mine water or NaCl solution, CaCl2 solution and AlCl3 solution, and after the conductive liquid is filled, the water inlet is sealed by the matching cover.

* * * * *